(12) United States Patent
Semnisky et al.

(10) Patent No.: US 11,358,227 B2
(45) Date of Patent: Jun. 14, 2022

(54) TOOLHOLDER ASSEMBLY WITH FLEXIBLE CANISTER

(71) Applicant: Kennametal Inc., Latrobe, PA (US)

(72) Inventors: Logan M. Semnisky, Latrobe, PA (US); Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 336 days.

(21) Appl. No.: 16/434,469

(22) Filed: Jun. 7, 2019

(65) Prior Publication Data

US 2020/0384543 A1 Dec. 10, 2020

(51) Int. Cl.
*B23B 29/04* (2006.01)
*B23B 29/14* (2006.01)

(52) U.S. Cl.
CPC ............ *B23B 29/046* (2013.01); *B23B 29/14* (2013.01); *B23B 2260/068* (2013.01)

(58) Field of Classification Search
CPC .......... B23B 2260/02; B23B 2260/068; B23B 29/046; B23B 29/14; B23B 29/1071; B23B 29/04; B23B 29/20; B23B 31/1071
See application file for complete search history.

(56) References Cited

U.S. PATENT DOCUMENTS

| | | | |
|---|---|---|---|
| 3,856,428 A * | 12/1974 | Eversole | B23B 29/03 408/240 |
| 4,710,077 A | 12/1987 | Ramunas | |
| 4,747,735 A | 5/1988 | Erickson et al. | |
| 4,890,523 A * | 1/1990 | Satran | B23B 29/046 82/158 |
| 4,932,295 A * | 6/1990 | Erickson | B23B 29/046 82/160 |
| 4,981,057 A | 1/1991 | von Haas et al. | |
| 5,054,344 A | 10/1991 | Erickson et al. | |
| 5,169,270 A | 12/1992 | Erickson | |
| 5,173,017 A | 12/1992 | Oshnock et al. | |
| 5,452,631 A | 9/1995 | Erickson | |
| 5,466,102 A * | 11/1995 | Erickson | B23B 29/046 409/232 |
| 5,599,146 A * | 2/1997 | Scheer | B23B 31/1072 409/234 |
| 5,697,740 A | 12/1997 | von Haas et al. | |

(Continued)

FOREIGN PATENT DOCUMENTS

| | | |
|---|---|---|
| DE | 7632521 U1 | 10/1982 |
| DE | 19818148 A1 | 10/1999 |
| EP | 1050359 A2 | 11/2000 |

*Primary Examiner* — Nicole N Ramos
(74) *Attorney, Agent, or Firm* — Larry R. Meenan

(57) ABSTRACT

A toolholder assembly includes a toolholder having a rearwardly facing toolholder shank, a base member having a bore configured for receiving the toolholder shank, a lock rod with an axial forward and an axial rearward end, at least one locking member in communication with the axial forward end of the lock rod, and a flexible canister configured for receipt in the bore of the base member. The flexible canister includes at least one flexible feature that reduces a stiffness (i.e., increases flexibility) of the flexible canister. In one aspect, the flexible feature is a slot proximate a locking passageway of the canister.

19 Claims, 6 Drawing Sheets

(56) References Cited

U.S. PATENT DOCUMENTS

| | | | | |
|---|---|---|---|---|
| 5,709,510 | A * | 1/1998 | Scheer | B23B 29/03421 407/9 |
| 6,000,306 | A * | 12/1999 | Erickson | B23B 29/046 82/160 |
| 6,003,416 | A * | 12/1999 | Ando | B23B 29/046 279/103 |
| 6,280,126 | B1 * | 8/2001 | Slocum | B23B 31/202 279/52 |
| 6,343,903 | B1 * | 2/2002 | Huang | B23B 29/046 279/2.23 |
| 6,370,995 | B1 * | 4/2002 | Skoog | B23B 29/046 82/160 |
| 7,610,834 | B2 | 11/2009 | Erickson | |
| 8,449,228 | B2 | 5/2013 | Guy | |
| 10,022,806 | B2 | 7/2018 | Langbein et al. | |
| 2003/0024131 | A1 * | 2/2003 | Erickson | B23B 29/046 33/645 |
| 2004/0096285 | A1 * | 5/2004 | Johne | B23B 29/03421 408/156 |
| 2009/0235790 | A1 * | 9/2009 | Erickson | B23B 31/006 82/160 |
| 2010/0272523 | A1 * | 10/2010 | Nagaya | B23B 29/046 407/110 |
| 2011/0058908 | A1 * | 3/2011 | Schaefer | B23B 29/043 407/110 |
| 2011/0067536 | A1 * | 3/2011 | Erickson | B23B 29/046 82/160 |
| 2012/0292863 | A1 * | 11/2012 | Craig | B23B 29/046 279/20 |
| 2015/0086282 | A1 * | 3/2015 | Zeeb | B23B 29/043 407/34 |
| 2018/0297124 | A1 | 10/2018 | Bookheimer et al. | |

* cited by examiner

TOOLHOLDER ASSEMBLY WITH FLEXIBLE CANISTER

BACKGROUND OF THE INVENTION

Typically, metal working operations are performed using a cutting insert of a hard metal mounted to a toolholder. The toolholder can be removably attached to a base member that is part of a machine, such as, for example, a lathe or a milling machine. Various arrangements for removably attaching and/or adjusting parameters of the toolholder in relation to the base member, such as, for example, a clamping unit with lock rod and spring pack are generally known.

Toolholder assemblies utilize spring packs in order to provide clamping force, as well as incorporate compliance into the clamping unit. The spring packs are desired to have high stiffness to provide high clamping force. In addition, a certain amount of compliance is required to compensate for the geometric tolerance of standard tools and ensure proper clamping. The problem with spring packs is that they require a lot of space to mount the clamping unit inside the machine tool.

Thus, it would be desirable to provide an improved toolholder assembly that overcomes limitations, shortcomings and/or disadvantages of conventional toolholder assemblies.

SUMMARY OF THE INVENTION

The problem of the use of spring packs in clamping units is solved by providing one or more flexure features in the design of the canister, thereby completely eliminating the spring pack from the clamping unit. As the result, the size of the clamping unit can be greatly reduced.

In one aspect, a toolholder assembly includes a toolholder having a rearwardly facing toolholder shank and an axial rearward end with an internal bore intersecting the axial rearward end, the toolholder shank having an outer surface and at least one locking aperture that extends from the outer surface to the internal bore. The toolholder assembly further includes a base member having a bore configured for receiving the toolholder shank; a lock rod with an axial forward end and an axial rearward end; and at least one locking member in communication with the axial forward end of the lock rod and movably positioned at least partially in the at least one locking passageway and/or the at least one locking aperture. The toolholder assembly further includes a flexible canister adapted to be received in the bore of the base member. The flexible canister has an outer surface and a canister bore that extends longitudinally into the flexible canister. The flexible canister has at least one locking passageway that extends from the outer surface of the flexible canister to the canister bore. The at least one locking passageway is in communication with the at least one locking aperture of the toolholder shank when the toolholder assembly is assembled. The flexible canister includes at least one flexible feature that reduces a stiffness of the flexible canister.

In another aspect, a flexible canister is adapted to be received in a bore of a base member of a toolholder assembly. The flexible canister has an outer surface and a canister bore that extends longitudinally into the flexible canister. The flexible canister has at least one locking passageway that extends from the outer surface of the flexible canister to the canister bore. The at least one locking passageway is in communication with at least one locking aperture of a toolholder shank when the toolholder assembly is assembled. The flexible canister includes at least one flexible feature that increases a flexibility of the flexible canister.

In yet another aspect, a method of reducing stiffness of a canister for a toolholder assembly, comprising:

forming at least one flexible feature into a canister, thereby reducing a stiffness of the canister.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
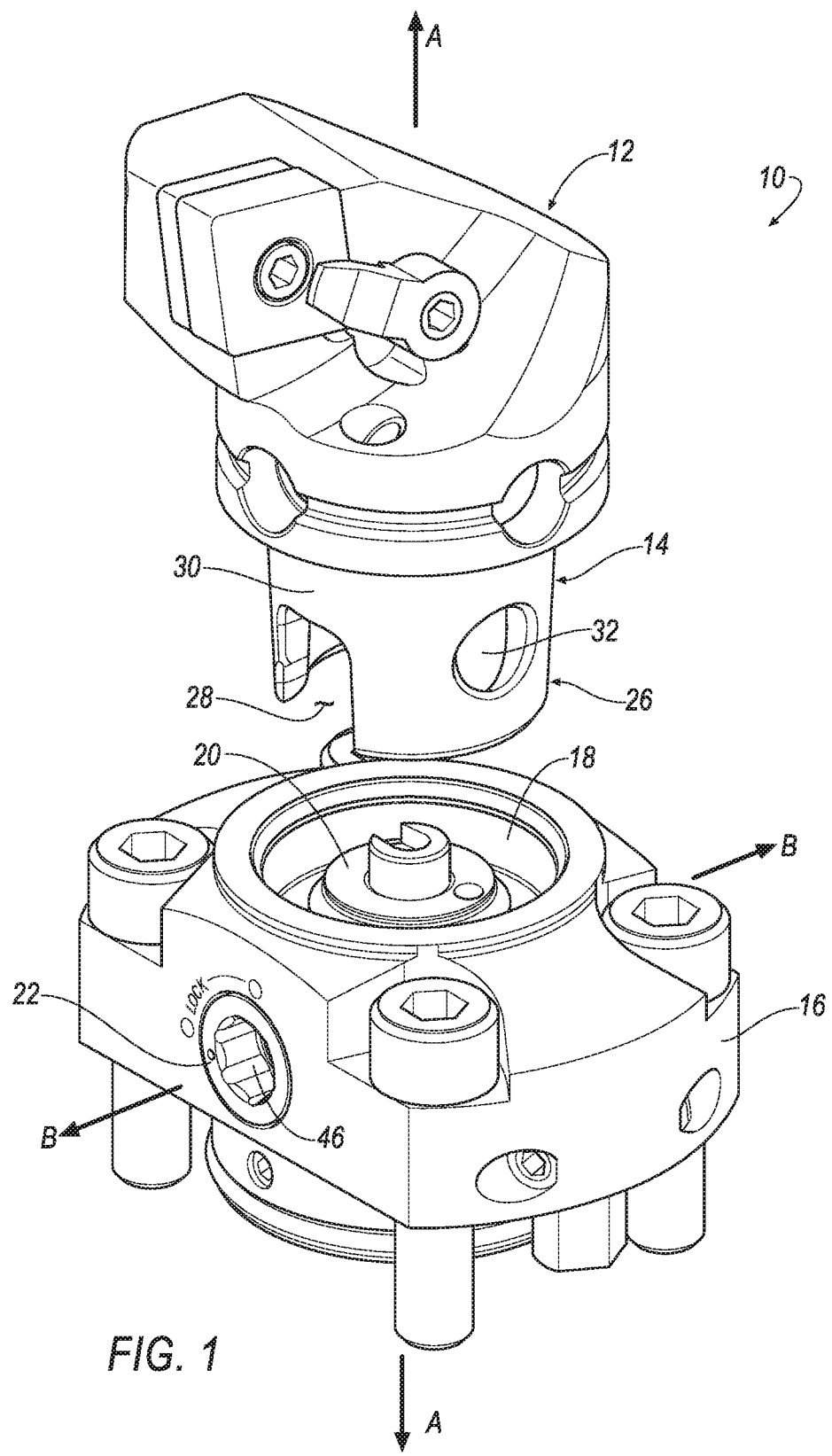
FIG. 1 illustrates a partially exploded view of a toolholder assembly according with an aspect of the invention.

Below are illustrations and explanations for a version of a toolholder used in turning operations, milling operations, and the like, that is right, left or neutral handed. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

As used herein, "optional" or "optionally" means that the subsequently described event or circumstance may or may not occur, and that the description includes instances where the event occurs and instances where it does not.

As used herein, "proximate" means closest in relation; immediate. For example, "proximate" may by synonymous with near, close, closest, nearest, next door, adjacent, adjoining, abutting, contiguous, and the like.

As used herein, the term "number" shall be used to refer to any non-zero quantity (i.e., one or any quantity greater than one).

As used herein, the term "slot" shall be used to refer to 1: any narrow opening or groove; and/or 2) any narrow passage or enclosure.

Figure 2:
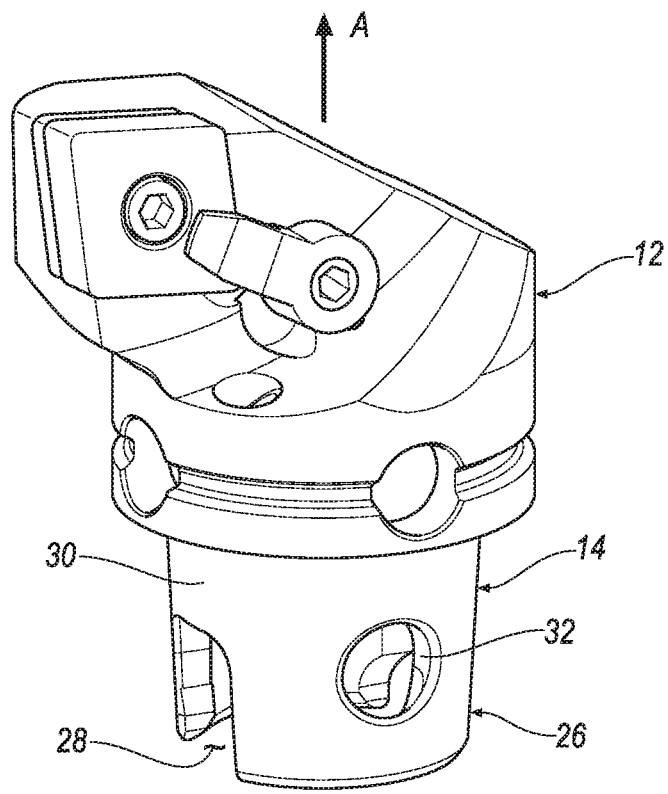
FIG. 2 illustrates an exploded view of a portion of the toolholder assembly of FIG. 1 according with an aspect of the invention.
Figure 2:
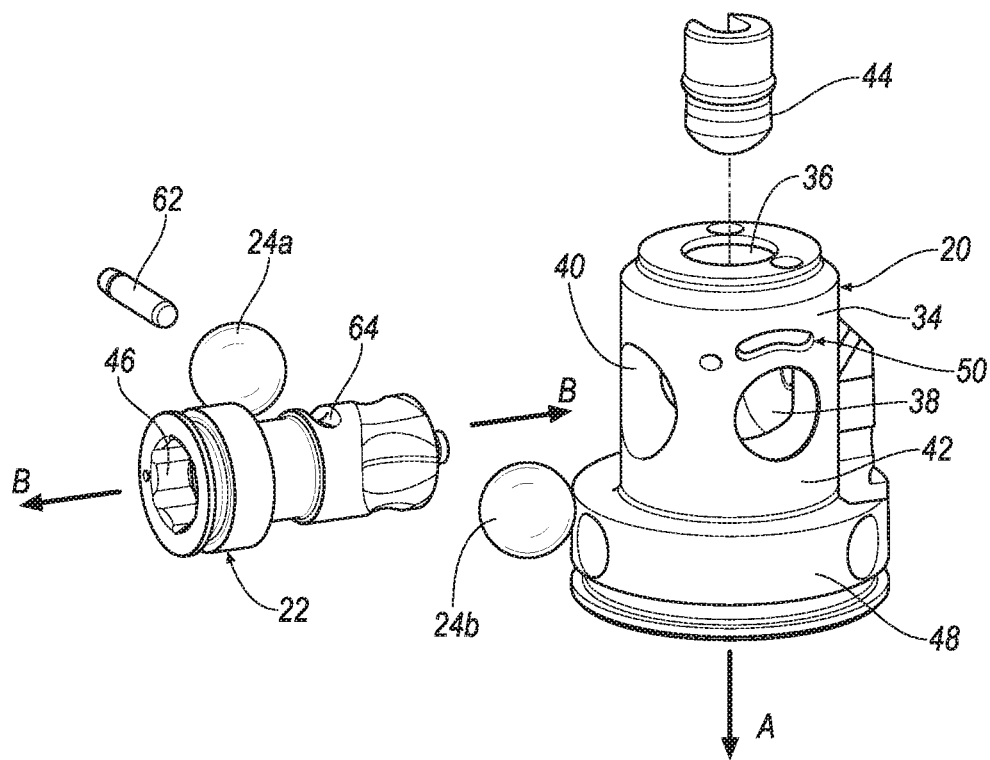
Figure 3:
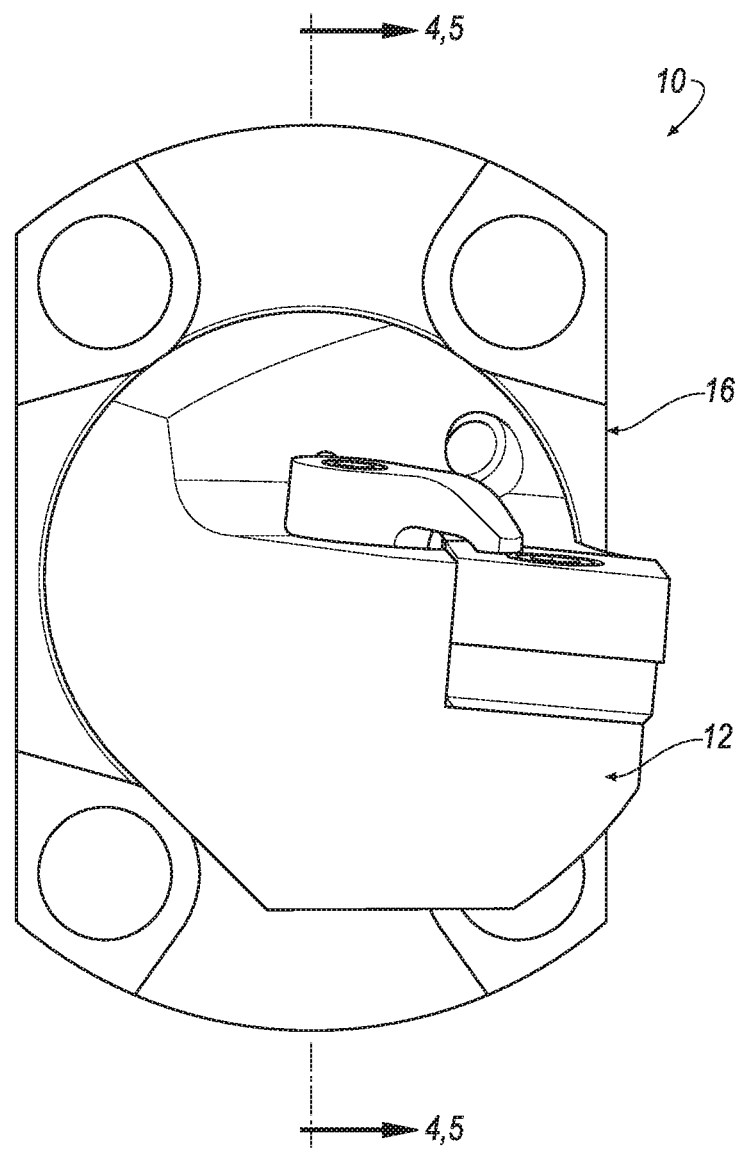
FIG. 3 illustrates an assembled top view of the toolholder assembly of FIG. 1 according with an aspect of the invention.

Referring to FIGS. 1-3, there is illustrated a toolholder assembly 10 in accordance with aspects of the invention. The toolholder assembly 10 generally includes a toolholder 12 having a rearwardly facing shank 14, a base member 16 (sometimes referred to as a flange) having a bore 18 configured for receiving the shank 14, a flexible canister 20 configured for receipt in the bore 18 of the base member 16 and a lock rod 22.

FIG. 2 illustrates an exploded view generally showing the toolholder 12, the flexible canister 20, the lock rod 22 and at least one locking member, which in one aspect includes locking balls 24a, 24b. The tool holder 12 and flexible canister 20 extend along a longitudinal axis A-A while the lock rod 22 is rotatable about a longitudinal axis B-B. In one aspect, the longitudinal axis A-A is non-parallel to the longitudinal axis B-B. It should be appreciated that the flexible canister 20 of the invention is not limited by the type of lock rod mechanism in the illustrated embodiment. For example, the lock rod 22 does not need to be rotatable, and other types of lock rod mechanisms can move linearly along axis B-B or A-A.

Referring to FIGS. 1 and 2, the toolholder 12 further includes an axial rearward end 26 with an internal bore 28 intersecting the axial rearward end 26. The toolholder shank 14 has an outer surface 30 and at least one locking aperture 32 that extends from the outer surface 30 to the internal bore 28.

FIG. 2 further illustrates that the flexible canister 20 of the invention has an outer surface 34 and a canister bore 36 that extends longitudinally along axis A-A into the flexible canister 20. In one embodiment, the canister bore 36 can extend longitudinally entirely into the flexible canister 20. The flexible canister 20 further includes at least one locking passageway 38 that extends from the outer surface 34 of the canister 20 to the canister bore 36. In one aspect, the at least one locking passageway 38 is in communication with or adjacent to the at least one locking aperture 32 of the toolholder shank 14. In addition, the flexible canister 20 has an additional bore 40 that extends along the longitudinal axis B-B of the lock rod 22 and is configured for receiving the lock rod 22. The flexible canister 20 includes a flange 48 for acting as a seating surface within the base member 16 of the toolholder assembly 10.

The lock rod 22 may include one or more grooves 64 that extend generally circumferentially about the lock rod 22. Each groove 64 is configured to cooperate with a stop pin 62 to generally provide a means for stopping and/or limiting rotation of the lock rod 22 between the locked and unlocked positions.

Figure 4:
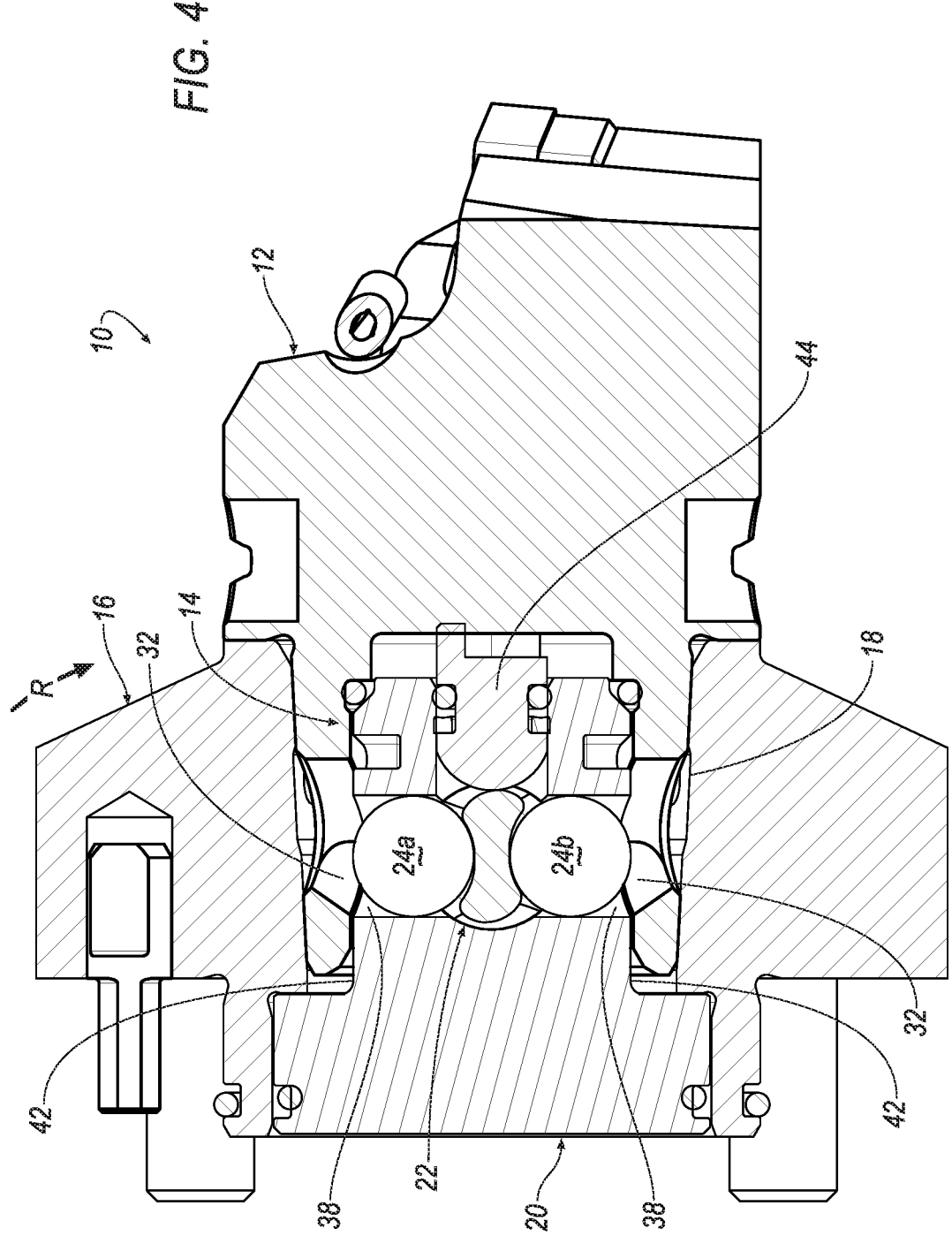
FIG. 4 illustrates a sectional view along line 4-4 of FIG. 3 and shows the toolholder assembly in an unlocked position according with an aspect of the invention.
Figure 5:
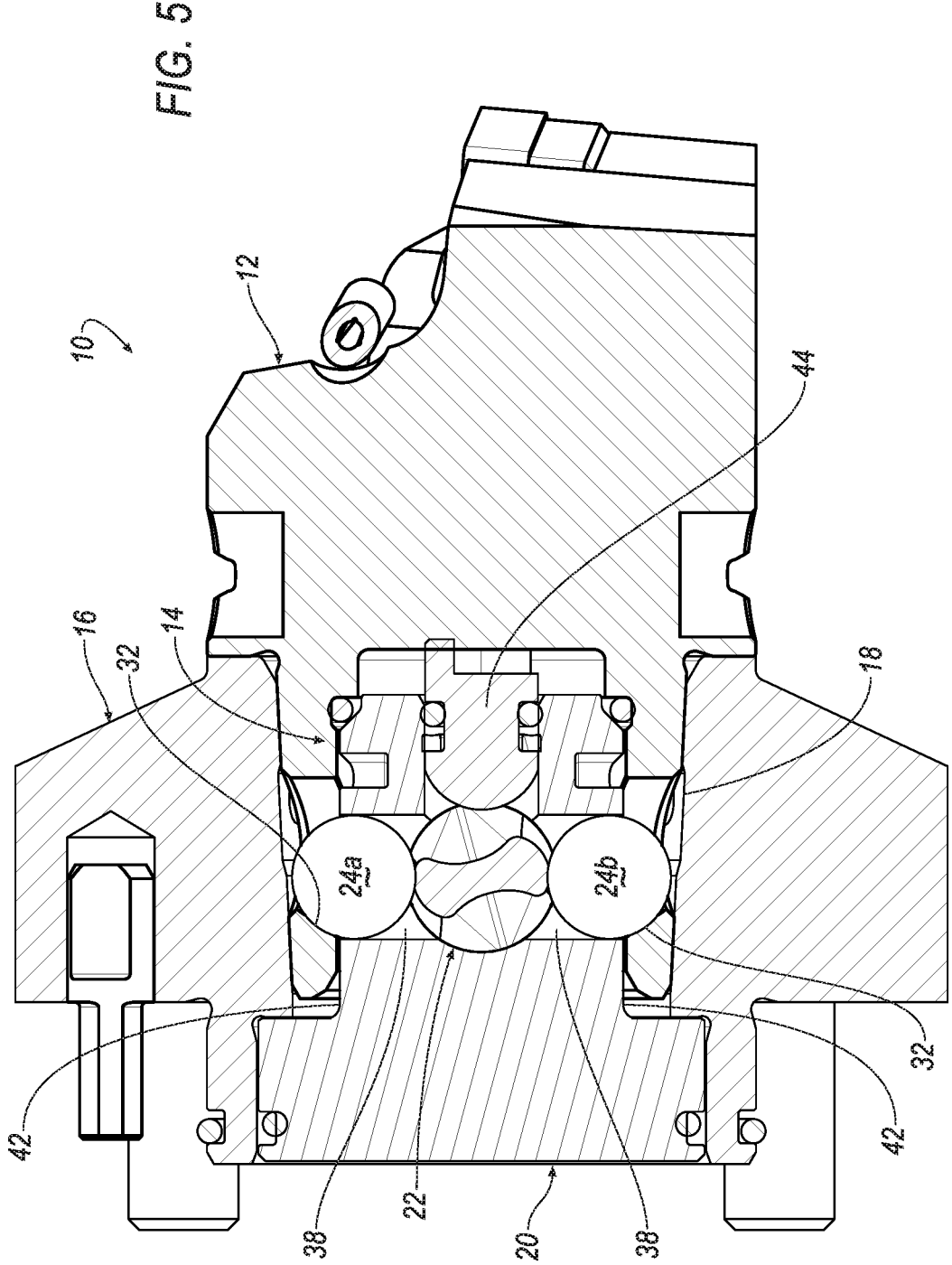
FIG. 5 illustrates a sectional view along line 5-5 of FIG. 3 and shows the toolholder assembly in a locked position according with an aspect of the invention.

FIGS. 4 and 5 illustrate the lock rod 22 being rotatable between unlocked or unclamped (FIG. 4) and locked or clamped (FIG. 5) positions for being able to easily secure and remove the toolholder 12 to and from, respectively, the toolholder assembly 10. To rotate the lock rod 22, the lock rod 22 can include an internal hex opening 46 (see FIGS. 1 and 2) for insertion of a tool (not shown) to cause rotation of the lock rod 22. Other similar configurations can be provided for causing rotation as well.

Generally, counterclockwise rotation of the lock rod 22 from the FIG. 4 position to FIG. 5 position locks or clamps the toolholder 12 in place. The described rotation of the lock rod 22 causes the locking balls 24a, 24b to move radially outward within the locking passageways 38 of the canister wall 42. The locking balls 24a, 24b are moved radially outward through the locking passageways 38 by the locking rod 22 configuration, as will be described in detail herein. As the locking balls 24a, 24b travel radially outward from the locking passageways 38, they engage the locking apertures 32 within the shank wall surface 30 and the locking balls 24a, 24b become wedged therein and thus being locked or clamped between the locking apertures 32 and the locking passageways 38, as shown in FIG. 5. Clockwise rotation of the lock rod 22 (in the direction of arrow, R, in FIG. 4) from the FIG. 5 position results in the reverse of the described action and thus the unlocking or unclamping of the toolholder 12.

In addition, FIGS. 2, 4 and 5 illustrate that the toolholder assembly 10 may include a bump off pin 44 for cooperating with the lock rod 22 to assist in expelling the toolholder 12 from the bore 18 of the base member 16 during the unlocking or unclamping operation.

Figure 6:
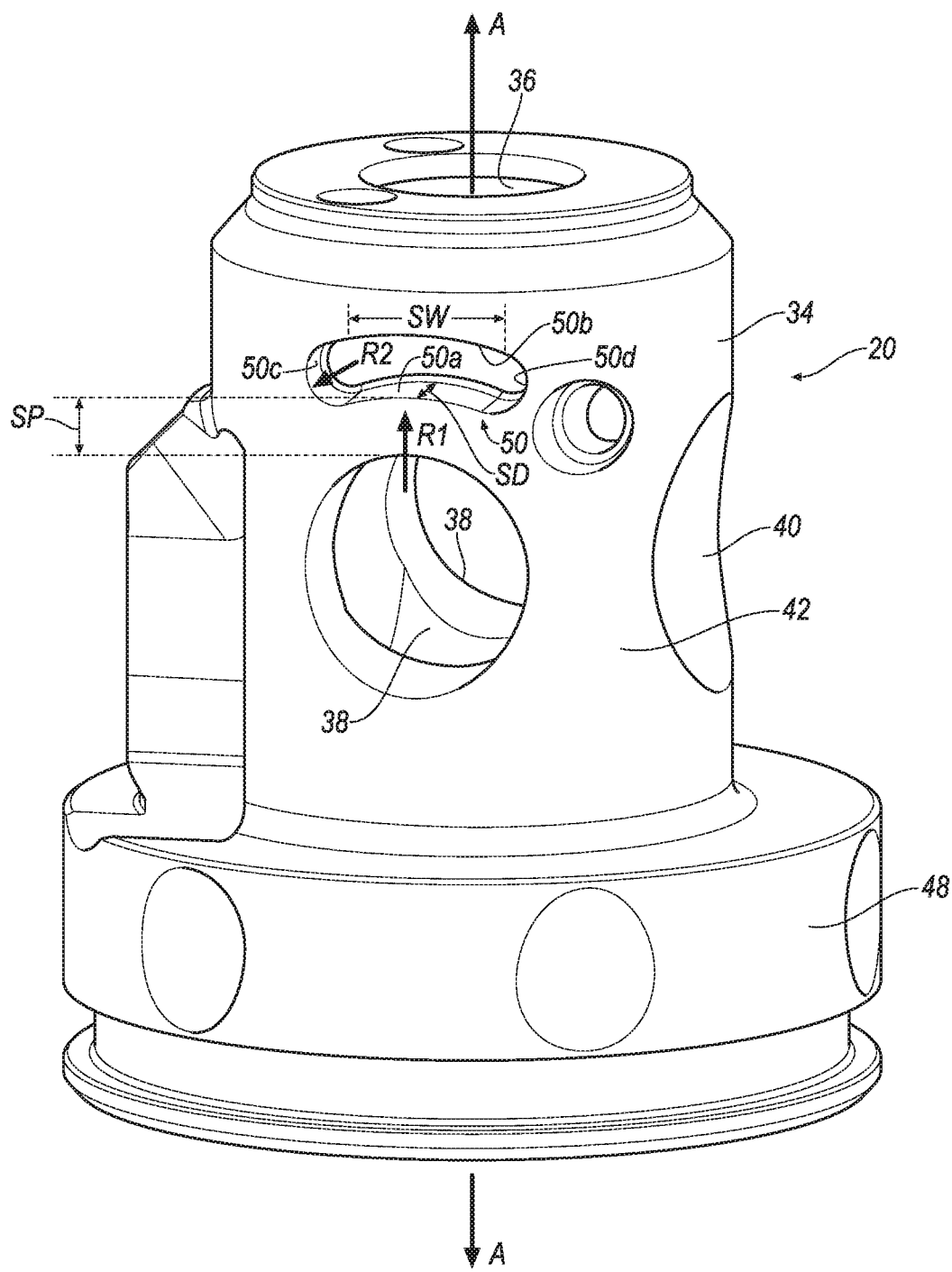
FIG. 6 illustrates a side perspective view of the flexible canister according with an aspect of the invention.

As shown in FIG. 6, the flexible canister 20 of the invention incorporates the flexibility directly into the design of the canister 20 in the form of one or more flexible features, shown generally at 50, which completely eliminates the spring pack from a conventional toolholder assembly. In general, to design the flexible canister 20 of the invention, a required flexibility of the canister 20 (Ad) is determined from the manufacturing tolerances of the clamping components. That is, it is the variation in the clamping position of the locking balls 24a, 24b. The canister 20 is designed so that the required flexibility results in a clamping force between the minimum and maximum limits throughout the entire range of clamping positions.

In the illustrated embodiment, the flexure feature 50 comprises at least one slot proximate a respective locking passageway 38 that extends inward from the outer surface 34 of the canister 20 toward the canister bore 36. Although not shown in FIGS. 2 and 6, the flexible canister 20 may include another slot that is diametrically opposite the slot 50 shown in FIGS. 2 and 6. It has been found that five design parameters of the slot 50 affect the flexibility (or stiffness) and performance of the canister 20. The first parameter is slot position, SP, which is the distance between the slot 50 and the locking passageway 38. The closer the slot 50 is located to the locking passageway 38, the more flexible (or less stiff) the canister 20. The second parameter is slot width, SW. The greater the width of the slot 50, the more flexible (or less stiff) the canister 20. The third parameter is slot depth, SD. The deeper the slot 50, the more flexible (or less stiff) the canister 20. In the illustrated embodiment, the slot depth, SD, is less than the thickness of the canister wall 42. However, in one embodiment, the slot depth, SD, is equal to the thickness of the canister wall 42 (i.e., maximum slot depth, SD). It should be appreciated that the slot depth, SD, can be less than the thickness of the canister wall 42. The fourth parameter is the radius, R1, of the arcuate side walls 50a, 50b of the slot 50. The larger the radius, R1, the more flexible (or less stiff) the canister 20. The fifth parameter is the radius, R2, of the arcuate end walls 50c, 50d of the slot 50. The larger the radius, R2, the more flexible (or less stiff) the canister 20.

The stiffness of the flexible canister 20 of the invention was calculated by measuring the location of a lock rod, similar to lock rod 22, at nominal and maximum ISO 26622 suggested clamping forces before and after adding the slot 50 to the canister 20. A reference of the locking passageway 38 having a diameter of 9.075 mm was used in the measurement. The design parameters for the slot 50 were as follows:

Slot Position (SP)=2 mm
Slot Width (SW)=6.5 mm
Slot Depth (SD)=3.5 mm
R1=8 mm
R2=1.25 mm The stiffness of the canister 20 with no slot was found to be 8.28E+06 N/m. The stiffness of the canister 20 with the slot 50 was found to be 5.87E+06 N/m, which is about a 30% reduction in stiffness, as compared to the canister with no slot.

It should be noted that the flexibility of the canister 20 can be achieved though many other designs for the flexibility feature 50. As mentioned above, the flange 48 of the canister 20 is the seating surface within the base member 16 of the toolholder assembly 10. When the tool is clamped, the canister 20 is pulled against the base member 16, which then causes the flexible feature(s) 50 to elastically deform. Flexible features that allow the canister 20 to flex include, for example, a flexible member (not shown) around the outer surface 34 of the canister 20, spring type designs, and slots within, above, or below the flange 48. These flexible features can be created by any combination of relief cuts, a complex hole cut out of the back of the canister 20, undercuts above and below the flange 48, grooves above and below the flange 48, wave like features within the flange 48, and slots above or below the flange 48. A large relief can be formed around the outer diameter of the canister directly above the flange with a complex hole feature in the bottom center of the canister. The combination of these flexible features creates a flexible member around the entire outer surface 34, and their design serves to relieve and distribute stress throughout the flexible member during flexing. In addition, one or more slots can be formed above one or more bores 38 that follow the contour of the bore 38 and act as compression springs. The slots above the bore 38 in conjunction with the flexible member in the flange 48 to allow for more elastic deformation with less restrictive tolerances in each respective feature.

As described above, the inventive idea presented here is an innovative design that the flexibility of the canister 20 can be achieved by multiple features within, below, and above the flange 48 (seating face of canister in clamping unit assembly) that are intended to elastically deform. In addition, slotted features can be added above one or more bores 38 in order to compress and provide additional compliance.

The patents and publications referred to herein are hereby incorporated by reference.

Having described presently preferred embodiments the invention may be otherwise embodied within the scope of the appended claims.

What is claimed is:

1. A toolholder assembly, comprising:
a toolholder having a rearwardly facing toolholder shank and an axial rearward end with an internal bore intersecting the axial rearward end, the toolholder shank having an outer surface and at least one locking aperture that extends from the outer surface to the internal bore;
a base member having a bore configured for receiving the toolholder shank;
a flexible canister extending along an axial direction from a first distal end to a second distal end and adapted to be received in the bore of the base member, the flexible canister having a canister wall defining an outer surface and a canister bore that extends longitudinally into the flexible canister, the flexible canister having at least one locking passageway that extends from the outer surface of the flexible canister wall to the canister bore, the at least one locking passageway being in communication with the at least one locking aperture of the toolholder shank when the toolholder assembly is assembled; and
at least one locking ball capable of being movably positioned in the at least one locking passageway of the flexible canister and/or the at least one locking aperture of the toolholder shank by a lock rod,
wherein the outer surface of the flexible canister wall comprises at least one flexible feature disposed closer to the first distal end than the second distal end and disposed between the at least one locking passageway and the first distal end, and wherein the at least one flexible feature extends inward from the outer surface of the flexible canister wall toward the canister bore in such a way that the at least one flexible feature reduces a stiffness of the flexible canister.

2. The toolholder assembly of claim 1, wherein the at least one flexible feature comprises a slot formed in the outer surface proximate the at least one locking passageway of the flexible canister.

3. The toolholder assembly of claim 2, wherein the slot comprises arcuate side walls having a radius, R1, and arcuate end walls having a radius, R2.

4. The toolholder assembly of claim 3, wherein the radius, R1, is greater than the radius, R2.

5. The toolholder assembly of claim 2, wherein the slot has a slot width, SW, that is smaller than a diameter of the at least one locking passageway of the flexible canister.

6. The toolholder assembly of claim 2, wherein the slot has a slot position, SP, a slot width, SW, and a slot depth, SD.

7. The toolholder assembly of claim 6, wherein the slot width, SW, has a dimension that is greater than at least one of the slot position, SP, and the slot depth, SD.

8. The toolholder assembly of claim 6, wherein the slot depth, SD, is greater than the slot position, SP.

9. The toolholder assembly of claim 6, wherein the slot depth, SD, is less than a thickness of the canister wall.

10. A flexible canister disposed along an axis from a first distal end to a second distal end and adapted to be received in a bore of a base member of a toolholder assembly, the flexible canister having a canister wall defining an outer surface and a canister bore that extends longitudinally into the flexible canister, the flexible canister having at least one locking passageway that extends from the outer surface of the flexible canister wall to the canister bore, the at least one locking passageway being in communication with at least one locking aperture of a toolholder shank such that at least one locking ball is capable of being movably positioned in the at least one locking passageway of the flexible canister and/or the at least one locking aperture of the toolholder shank by a lock rod when the toolholder assembly is assembled, wherein the outer surface of the flexible canister wall comprises at least one flexible feature disposed closer to the first distal end than the second distal end and disposed between the at least one locking passageway and the first distal end, and wherein the at least one flexible feature extends inward from the outer surface of the flexible canister wall toward the canister bore in such a way that the at least one flexible feature increases flexibility of the flexible canister.

11. The flexible canister of claim 10, wherein the flexible feature comprises a slot formed in the outer surface proximate the at least one locking passageway of the flexible canister.

12. The flexible canister of claim 11, wherein the slot comprises arcuate side walls having a radius, R1, and arcuate end walls having a radius, R2.

13. The flexible canister of claim 12, wherein the radius, R1, is greater than the radius, R2.

14. The flexible canister of claim 11, wherein the slot has a slot position, SP, a slot width, SW, and a slot depth, SD.

15. The flexible canister of claim 14, wherein the slot width, SW, has a dimension that is greater than at least one of the slot position, SP, and the slot depth, SD.

16. The flexible canister of claim 14, wherein the slot depth, SD, is greater than the slot position, SP.

17. The flexible canister of claim 14, wherein the slot depth, SD, is less than a thickness of the canister wall.

18. A toolholder assembly, comprising:
a toolholder having a rearwardly facing toolholder shank and an axial rearward end with an internal bore intersecting the axial rearward end, the toolholder shank having an outer surface and at least one locking aperture that extends from the outer surface to the internal bore;
a base member having a bore configured for receiving the toolholder shank;
a flexible canister disposed along an axis and adapted to be received in the bore of the base member, the flexible canister having a canister wall defining an outer surface and a canister bore that extends longitudinally into the flexible canister, the flexible canister having at least one locking passageway that extends along a plane transverse to the axis from the outer surface of the flexible canister wall to the canister bore, the at least one locking passageway being in communication with the at least one locking aperture of the toolholder shank when the toolholder assembly is assembled; and
at least one locking ball capable of being movably positioned in the at least one locking passageway of the flexible canister and/or the at least one locking aperture of the toolholder shank by a lock rod, wherein the outer surface of the flexible canister wall comprises at least one flexible feature disposed closer to the first distal end than the second distal end and disposed between the at least one locking passageway and the first distal end, and wherein the at least one flexible feature extends inward from the outer surface of the flexible canister wall toward the canister bore in such a way that the at least one flexible feature reduces a stiffness of the flexible canister.

19. A flexible canister disposed along an axis and adapted to be received in a bore of a base member of a toolholder assembly, the flexible canister having a canister wall defining an outer surface and a canister bore that extends longitudinally into the flexible canister, the flexible canister having at least one locking passageway that extends along a plane transverse with respect to the axis from an outer surface of the flexible canister wall to the canister bore, the at least one locking passageway being in communication with at least one locking aperture of a toolholder shank such that at least one locking ball is capable of being movably positioned in the at least one locking passageway of the flexible canister and/or the at least one locking aperture of the toolholder shank by a lock rod when the toolholder assembly is assembled, wherein the outer surface of flexible canister wall comprises at least one flexible feature disposed between the plane of the at least one locking passageway, and wherein the at least one flexible feature extends inward from the outer surface of the flexible canister wall toward the canister bore in such a way that the at least one flexible feature increases flexibility of the flexible canister.

* * * * *